Oct. 29, 1935.  C. H. BOCK  2,019,289
LUBRICATING DEVICE
Filed Feb. 20, 1933    2 Sheets—Sheet 1
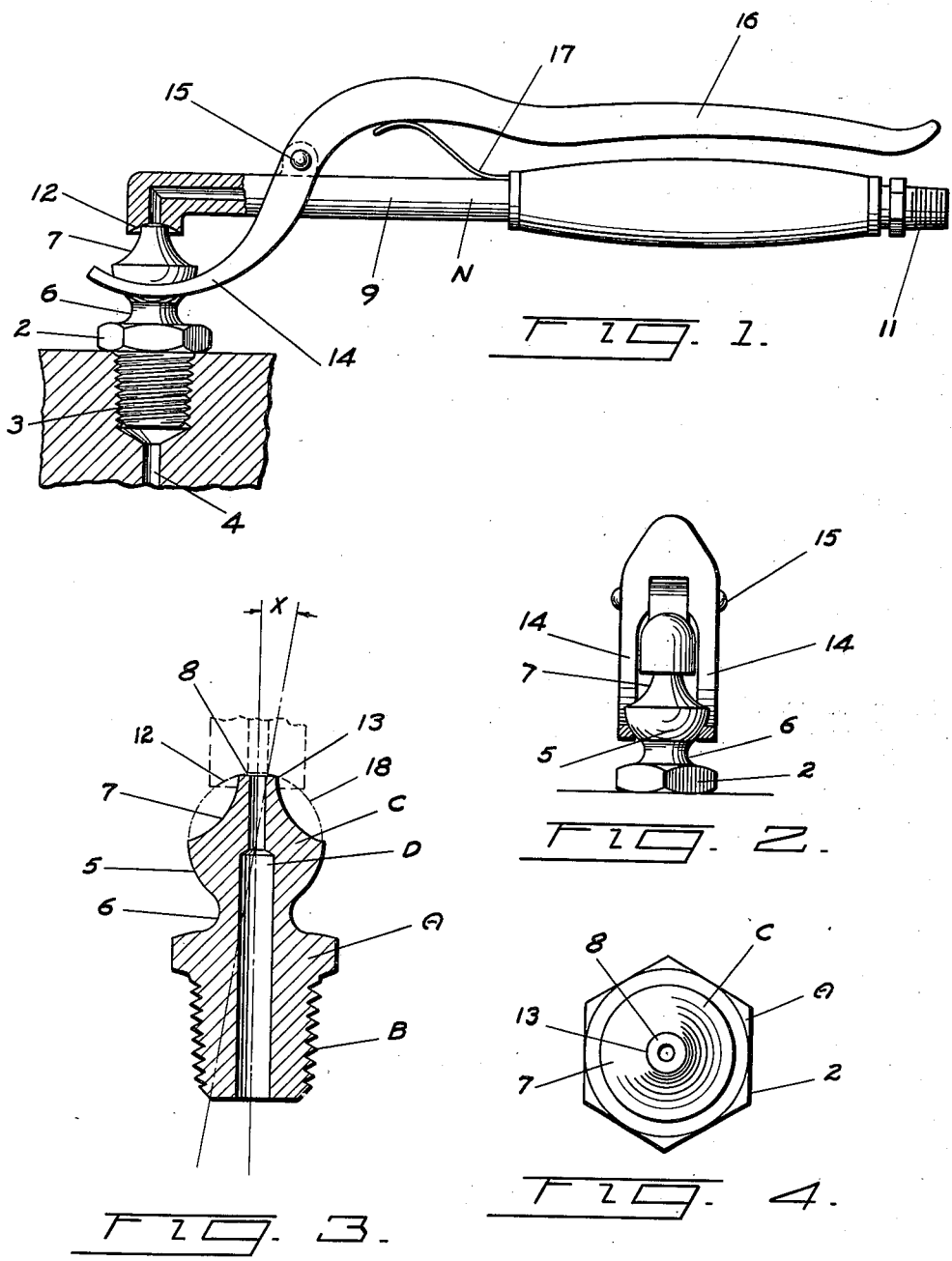
INVENTOR.
CLARENCE H. BOCK
BY John A. Watson
ATTORNEY Oct. 29, 1935. C. H. BOCK 2,019,289
LUBRICATING DEVICE
Filed Feb. 20, 1933  2 Sheets-Sheet 2

INVENTOR.
CLARENCE H. BOCK
BY *John A. Watson*
ATTORNEY.

Patented Oct. 29, 1935

2,019,289

UNITED STATES PATENT OFFICE 2,019,289

LUBRICATING DEVICE

Clarence H. Bock, South Bend, Ind., assignor to The Lubrication Corporation, Chicago, Ill., a corporation of Delaware Application February 20, 1933, Serial No. 657,575

2 Claims. (Cl. 285—170)

This invention relates to improvements in lubricating devices and more particularly to lubricant receiving fittings and lubricant couplers or discharge nozzles therefor.

Heretofore many types of lubricant receiving fittings of the type commonly used on bearings and other moving parts of automobile chassis and the like have been provided wherein universal sealing engagement between a lubricant discharge nozzle and the fitting may be established and maintained during the servicing operation, thereby obtaining the advantages of a wide angle of approach, a characteristic which is of particular advantage in such cases as when the fitting is located in an ordinarily inaccessible position on the chassis. This type of fitting with the exception of one species in which the head of the fitting is spherical may not be employed efficiently with nozzles or couplers intended for clamping engagement therewith.

An object of this invention is to provide a lubricant receiving fitting having the advantages attributed to fittings of the character described other than those possessed of a spherical head and in addition the capability of universal clamping engagement by the nozzle or coupler during the servicing operation.

Another object is to provide a lubricant receiving fitting providing surfaces of relatively large area with which the clamping instrumentality of the nozzle or coupler may slidably engage, thus to distribute the application of clamping forces and eliminate mutilation to the fitting head as from excessive clamping pressure.

A further object is to provide, in combination, a lubricant receiving fitting and clamp type nozzle therefor wherein that area of the fitting subjected to lubricant pressure is relatively small as compared to the permissible angular range of movement of the nozzle over the fitting throughout the servicing operation.

Other objects, the advantages and uses of the invention will be, or should become, apparent after reading the following description and claims and after consideration of the accompanying drawings forming a part of this specification, in which:

Fig. 1 is a side elevation of a lubricant receiving fitting and discharge nozzle in clamping engagement therewith, illustrating one embodiment of the invention;

Fig. 2 is a front end elevation of the fitting and nozzle illustrated in Fig. 1 the jaws of the nozzle being in section;

Fig. 3 is a vertical sectional view of the fitting;

Fig. 4 is a top plan view of the fitting;

Figure 5:
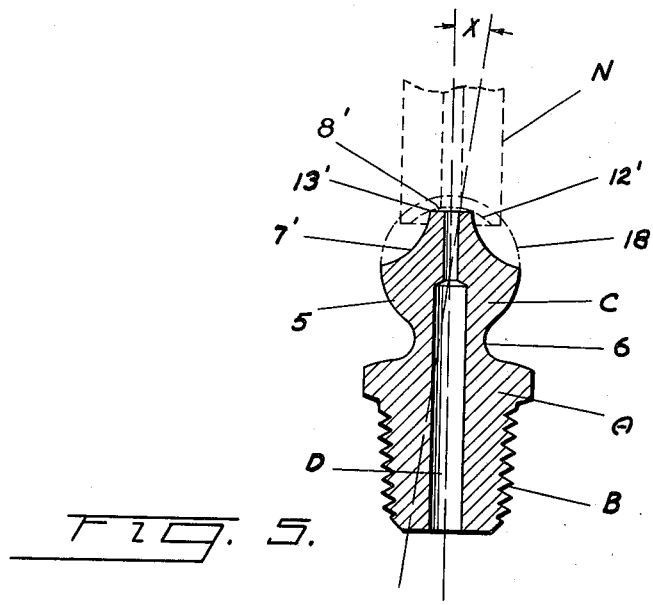
Fig. 5 is a sectional view of another form of the fitting.

In general the lubricant fittings selected for illustration herein comprise a body portion A having an externally threaded shank B for securing the fittings within the threaded portion of a lubricant conducting passageway, a head portion C and a lubricant passageway D one end of which terminates at the apex of the head portion C. The entire fitting may be constructed of a single piece of steel stock by screw machine process.

With reference to the drawings the body A may be formed with hexagonal side walls 2 adapted to be received by the jaws of a mechanic's wrench whereby the fitting may be more readily screwed into place in an internally threaded portion 3 of a lubricant receiving passageway 4. The lower portion 5 of the external walls of the head C rising above the neck 6 of the fitting define the zone of a sphere. The upper portion of the fitting head is formed with concave and conical side walls truncated at 8 in a plane transverse to the axis thereof, thus providing a nozzle engaging contour for the fitting of the general type disclosed in U. S. Patent No. 1,475,980 issued to O. Zerk on December 4, 1923 together with the attendant advantages and functions thereof.

Referring to Fig. 1 the discharge nozzle or coupler N illustrated comprises a conduit 9 having one end 11 threaded for connection with a source of lubricant supply and the other end formed to provide a discharge orifice 12 the walls of which are spherical and located upon an axis extending transversely to the longitudinal axis of the conduit. The radius about which the walls of the orifice 12 are generated is preferably equal to the radius of curvature of the surface 5 of the fitting and the perimeter, or so called dirt-cutting edge 13, of the fitting surface 8 lies within an imaginary extension into space of the surface 5 indicated by dot and dash lines 18 thereby assuring an annular metal to metal contact between the fitting head and walls of the orifice throughout a range of angular movement of the nozzle relative to the fitting represented in Fig. 3 as twice the angle X.

A bifurcated clamping member having jaws 14 is pivotally mounted at 15 upon the conduit 9 in such a manner as to be drawn toward the discharge orifice 12 when manual pressure is applied to a rearwardly extending hand grip 16 formed integrally therewith. A cantilever spring 17 may be employed to hold the hand grip 16 yieldingly away from the conduit and thus maintain the jaws 14 normally in an unclamped position. As may be seen in Fig. 1 the jaws 14 are curved to follow the curvature of the spherical surface 5 of the fitting so as to facilitate angular movement of the nozzle relative to the fitting subsequent to engagement of the walls of its discharge orifice 12 with the fitting head C.

In Fig. 5 another form of the fitting is illustrated wherein the perimeter or dirt-cutting edge 13' of the surface 8' lies inside of an imaginary extension into space of the spherical or clamp engaging surface 5 of the fitting indicated at 18 and wherein the radius of curvature of the nozzle discharge orifice 12' is less than the radius of curvature of the surface 5. As in the fitting of Fig. 1, however, the center of the nozzle orifice wall 12' coincides with the center of the fitting surface 5 when the nozzle is in operative engagement with the fitting, as shown, to assure a full range of nozzle movement over the fitting head without interference by the clamping instrumentality of the nozzle.

Figure 6:
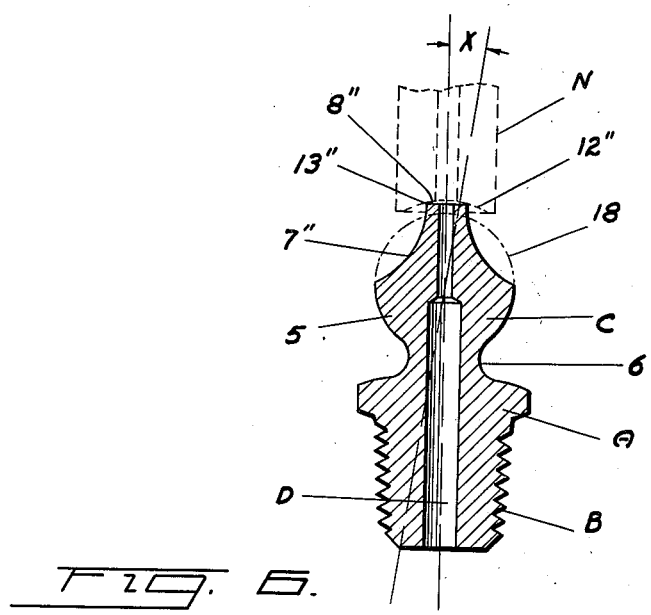
Fig. 6 is a sectional view of a further form of the fitting.

In Fig. 6 another form of the fitting is shown wherein the contacting area or dirt cutting edge 13" of the fitting is located beyond the imaginary extension into space of the surface 5. The nozzle N for servicing the fitting may be provided with a discharge orifice wall 12" generated upon a radius exceeding in length that of the radius of the surface 5 of the fitting, the two radii having their centers in common when the nozzle is engaged with the fitting as shown.

In the three embodiments of the fitting illustrated the radius of the spherical surface of the fitting is generated about a point determined by the location of the center of the spherical walls of the nozzle discharge orifice when the nozzle is applied to the fitting as shown. This arrangement is preferred as it assures uniform clamping engagement between nozzle and fitting during the movement of the nozzle throughout its permissible angular range over the fitting head.

There is thus provided in a fitting construction as herein described the functions attributed to fittings of the character possessing head contour generally resembling that of the upper portion of the head C, such as relatively small area of that portion of the fitting surface subjected to lubricant pressure with respect to the angular range of movement between the nozzle and fitting, and an annular line contact between the fitting and nozzle discharge orifice walls for establishing the lubricant tight seal required to preclude leakage during the servicing operation at relatively high discharge pressure.

It is to be understood that the embodiments of the invention herein set forth are presented for the purpose of illustration only and various changes may be made therein without departing from the spirit and scope of the invention.

I claim:

1. A nipple adapted to be used with a nozzle having a concave discharge orifice and clamping means, comprising, a head and a neck, said head having an unobstructed spherical surface of substantial area on one side thereof adjacent the neck adapted to be slidably engaged by said clamping means to provide for limited universal movement between the nozzle and nipple, said head having a contact surface on the opposite side thereof adapted sealingly to engage said discharge orifice, said contact surface including a relatively sharp annular nozzle contacting edge connected to said spherical surface by a non-spherical surface.

2. A nipple adapted to be used with a nozzle having a concave discharge orifice and clamping means comprising a head and a neck, said head having an unobstructed spherical surface of substantial area on one side thereof adjacent the neck adapted to be slidably engaged by said clamping means to provide for limited universal movement between the nozzle and nipple, said head having a contact surface on the opposite side thereof adapted sealingly to engage said discharge orifice, said contact surface including a relatively sharp annular nozzle contacting edge connected to said spherical surface by a non-spherical surface, and said annular edge lying on an extension into space of said spherical surface.

CLARENCE H. BOCK.